US011912329B2

(12) United States Patent
Froemel et al.

(10) Patent No.: US 11,912,329 B2
(45) Date of Patent: Feb. 27, 2024

(54) STEERING DEVICE FOR A VEHICLE AND VEHICLE EQUIPPED THEREWITH

(71) Applicant: Bayerische Motoren Werke Aktiengesellschaft, Munich (DE)

(72) Inventors: Christian Froemel, Grosskarolinenfeld (DE); Stefan Goldammer, Pfaffenhofen an der Ilm (DE); Tobias Lachner, Rohrbach (DE); Martin Wiesinger, Lamerdingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/016,017

(22) PCT Filed: Jun. 17, 2021

(86) PCT No.: PCT/EP2021/066392
§ 371 (c)(1),
(2) Date: Jan. 13, 2023

(87) PCT Pub. No.: WO2022/012846
PCT Pub. Date: Jan. 20, 2022

(65) Prior Publication Data
US 2023/0211821 A1 Jul. 6, 2023

(30) Foreign Application Priority Data

Jul. 16, 2020 (DE) ...................... 10 2020 118 867.6

(51) Int. Cl.
*B62D 1/04* (2006.01)
*B62D 1/02* (2006.01)

(52) U.S. Cl.
CPC .................. *B62D 1/04* (2013.01); *B62D 1/02* (2013.01)

(58) Field of Classification Search
CPC ............... B62D 1/04; B62D 1/02; B62D 1/12
See application file for complete search history.

(56) References Cited

U.S. PATENT DOCUMENTS 3,196,709 A * 7/1965 Bickford .................. B62D 1/14
D12/175
7,726,692 B2 6/2010 Ozaki et al.
(Continued)

FOREIGN PATENT DOCUMENTS

JP       11-342849 A      12/1999
JP      2004-98758 A       4/2004
(Continued)

OTHER PUBLICATIONS

International Search Report (PCT/ISA/210) issued in PCT Application No. PCT/EP2021/066392 dated Sep. 15, 2021 with English translation (five (5) pages).
(Continued)

*Primary Examiner* — Drew J Brown
(74) *Attorney, Agent, or Firm* — Crowell & Moring LLP

(57) ABSTRACT

A steering apparatus for a vehicle, includes: a handle element for actuating the steering by hand; a lever element for transmitting a torque to a steering axle of the steering column of the vehicle in order to steer the vehicle; and a coupling device for coupling the handle element to the lever element so as to convert a force in order to convert a steering movement carried out on the handle element into a rotational movement of the lever element about a steering angle with respect to the steering column. The handle element is rotatably mounted relative to the lever element, and the coupling device is designed to convert the rotational movement of the lever element that occurs in the event of a steering movement into a translational movement of a coupling element of the coupling device, and then convert the translational movement back into a rotational movement of the handle element relative to the lever element such that during the translational movement of the coupling element, the coupling element is operatively connected to a guide, in the sense of a forced guiding process, such that a geometric
(Continued)

course of the guide defines a steering angle-based curve of the rotational movement of the handle element.

19 Claims, 6 Drawing Sheets

(56) References Cited

U.S. PATENT DOCUMENTS

| | | | | |
|---|---|---|---|---|
| 8,540,281 | B2* | 9/2013 | Lisseman | B62D 1/12 |
| | | | | 180/332 |
| 8,960,043 | B2* | 2/2015 | Kimura | B62D 1/02 |
| | | | | 280/778 |
| 10,457,316 | B2* | 10/2019 | Netzer | B62D 1/04 |
| 10,933,901 | B2* | 3/2021 | Kreutz | B62D 1/06 |
| 11,608,103 | B2* | 3/2023 | Morita | B62D 1/02 |
| 2007/0221007 | A1 | 9/2007 | Ozaki et al. | |
| 2013/0014604 | A1 | 1/2013 | Kimura et al. | |

FOREIGN PATENT DOCUMENTS

| | | |
|---|---|---|
| KR | 10-1858398 A1 | 6/2018 |
| WO | WO 2018/114136 A1 | 6/2018 |

OTHER PUBLICATIONS

German-language Written Opinion (PCT/ISA/237) issued in PCT Application No. PCT/EP2021/066392 dated Sep. 15, 2021 (five (5) pages).

German-language Search Report issued in German Application No. 10 2020 118 867.6 dated May 20, 2021 with partial English translation (14 pages).

German-language Office Action issued in German Application No. 10 2020 118 867.6 dated Jun. 6, 2021 (nine (9) pages).

* cited by examiner

STEERING DEVICE FOR A VEHICLE AND VEHICLE EQUIPPED THEREWITH

BACKGROUND AND SUMMARY

The present invention relates to a steering apparatus for actuating a steering system of a vehicle and a vehicle which is equipped with such a steering apparatus. The vehicle may particularly be a two-track land vehicle.

Various steering apparatuses, including in particular so-called steering wheels or handlebars, which are rotatably supported about a steering axle of a steering column are known for actuating in a manner controlled by the driver a steering system of vehicles, in particular land vehicles, such as, for example, motor vehicles, and water-borne vehicles, such as, for example, motor boats and ships.

Another construction type, which does not have any steering wheel or handlebar, of a steering apparatus is known from WO 2018/114136 A1, which discloses as an alternative to a steering wheel a steering apparatus for a vehicle which has a transverse element which can be rotatably mounted about a steering axle in the vehicle and which further has at least one steering unit at least at one side of the transverse element. The steering unit has a handle for actuating the steering apparatus and an intermediate piece which connects the handle to the transverse element, wherein the intermediate piece is arranged on the transverse element so as to be rotatable about a rotation axle, and wherein the rotation axle is spaced apart from and substantially parallel with the steering axle.

In particular, in this known steering apparatus, the steering unit may comprise a drive apparatus for rotating the intermediate piece about the rotation axle, wherein this rotation is particularly brought about by means of an electric motor or a special mechanism so that, in the event of a rotation of the transverse element about the steering axle when the steering apparatus is actuated, the orientation of the steering unit in space remains constant as a result of the relative rotation which is brought about by the electric motor or a special mechanism between the steering unit and the transverse element.

Such a steering apparatus can particularly have two steering units which are arranged at one side of the transverse element and which are provided to be gripped by a different hand of a human driver in the case of actuation of the steering apparatus and to be moved in the manner of a steering movement in order to rotate the transverse element.

As a result of the physical build of humans, however, during such a steering movement every position, in particular orientation, of one or more steering units of such a steering apparatus is not equally ergonomical. In this case, the ergonomics of a specific position of the steering unit in space can particularly vary in accordance with the steering angle. A handle grip with poor ergonomics can again limit the driver in terms of his/her ability to move or even lead to the steering unit being released at least temporarily. This may also be particularly relevant when a rotation angle of more than one complete revolution is passed through in the context of the steering movement, for example, in the case of a powerful "lock" of a steering system.

An object of the present invention is to improve the operation-friendliness and ergonomics of steering apparatuses which have at least one handle element which is provided for gripping with one hand for actuating the steering apparatus. In particular, it is desirable to further improve the operability and ergonomics of a steering apparatus of the above-mentioned construction type from WO 2018/114136 A1.

This object is achieved according to the teaching of the independent claims. The dependent claims relate to different embodiments and developments of the invention.

A first aspect of the invention relates to a steering apparatus for a vehicle, in particular a land vehicle, such as, for example, a two-track land vehicle, or for a water-borne vehicle, such as, for example, a boat or ship. The steering apparatus has: (i) a handle element for actuating the steering apparatus by means of one hand of a driver of the vehicle; (ii) a lever element, in particular a transverse element or a steering bar or a steering wheel, for transmitting a torque to a steering axle of the steering column of the vehicle in order to steer it; and (iii) a coupling device for bringing about a force-converting coupling between the handle element and the lever element in order to convert a steering movement which is carried out on the handle element, in particular a rotational movement, into a rotational movement of the lever element about a steering angle with respect to the steering axle.

The handle element is rotatably supported with respect to the lever element. The coupling device is configured to convert the rotational movement, which occurs during the steering movement, of the lever element into a translational movement of a coupling element of the coupling device and to bring about a subsequent conversion of this translational movement back into a rotational movement of the handle element relative to the lever element in such a manner that the coupling element during its translational movement is actively connected to a guide in the manner of a forced guide so that the geometric extent of the guide defines a steering-angle-dependent extent of the rotational movement of the handle element. The guide may have in particular a slot, a web or a groove, the geometric extent of which defines the geometric extent of the guide.

The term "steering apparatus" in the context of the present invention is in particular intended to be understood to be an apparatus which is configured to cooperate with a rotation axle or shaft (steering axle) of a steering column of a vehicle in order to apply a torque thereto and consequently to rotate the rotation axle or shaft and therefore to actuate a steering system, which is coupled thereto, of the vehicle. In particular, steering wheels and handlebars and the additional construction type, without steering wheels and handlebars, of a steering apparatus from the above-mentioned publication WO 2018/114136 A1 are steering apparatuses in the context of the present invention.

The term "handle element" in the context of the present invention is intended to be understood to be a physical structure which is configured to be gripped by means of a hand of a driver of the vehicle in order to actuate the steering apparatus and to be moved thereby in the manner of a steering movement in space. In particular, the handles and steering units which are mentioned in the above-mentioned publication WO 2018/114136 A1 are handle elements in the context of the present invention.

The term "lever element" in the context of the present invention is intended to be understood to be a physical structure which is capable of acting as a force converter and in this case to transmit a torque which is applied by the one or more handle elements coupled to the lever element to a rotation axle (steering axle) of a steering column of the vehicle in order to rotate the rotation axle and therefore to actuate a steering system, which is coupled to the steering axle, of the vehicle. The form of the lever element may be freely selected under the above-mentioned prerequisites, but with particularly a shaping as a transverse element, which is in particular rod-shaped or bar-shaped (for example, steering bar) being advantageous as a result of the small structural space requirement thereof.

The term "coupling device" in the context of the present invention is in particular intended to be understood to be a force converter apparatus which is configured to couple, on the one hand, a steering movement which is carried out on the handle element by the driver of the vehicle, in particular a rotational movement, to the lever element in order to rotate the lever accordingly with the steering axle about a steering angle and, on the other hand, to convert this rotational movement of the lever element into a movement of the converter element which, directly or indirectly via an additional force conversion, brings about a rotational movement of the handle element relative to the lever element.

The term "rotation", "rotate", "rotational" and related modifications thereof always relate to a rotation in the sense of an inherent rotation of the rotating component. A rotation of a first component with respect to a second component accordingly means that the first component carries out an inherent rotation with respect to a reference system which is defined by the second component and in which the second component is located.

The terms which are used above where applicable "comprises", "contains, "includes", "has", "with", "having" or any other variant thereof are not intended to cover an exclusive inclusion. Thus, for example, a method or an apparatus which comprises or has a list of elements is not necessarily limited to these elements, but instead can include other elements which are not expressly set out or which are inherent to such a method or apparatus.

Furthermore, the term "or", unless the reverse is expressly set out, relates to an inclusive "or" and not an exclusive "or". For example, a condition A or B is met by one of the following conditions: A is true (or present) and B is false (or not present), A is false (or not present) and B is true (or present) and both A and B are true (or present).

The terms "a" or "an", as used herein, are defined in the sense of "one or more". The terms "another" and "an additional" and any other variant thereof are intended to be understood in the sense of "at least one other".

The term "plurality", as used herein, is intended to be understood in the sense of "two or more".

The above-mentioned steering apparatus causes feedback to the handle element to be carried out, in the event of an actuation of the steering apparatus, during which the lever element rotates the steering axle as a result of the associated steering movement, in such a manner that the orientation of the handle element is adjusted in accordance with the geometric extent of the guide. Thus, it is particularly possible to bring about a steering-angle-dependent extent of the orientation of the handle element with respect to a rotation axle of the handle element in a manner which is predetermined by the geometric extent of the guide. Thus, particularly with respect to the steering apparatus which is described in the publication WO 2018/114136 A1 and in which the orientation of the handle elements is always kept unchanged, by corresponding configuration of the extent of the guide an orientation, which changes in accordance with the steering angle, of the handle element can be achieved, which can be used to improve the ergonomics and consequently the operation-friendliness of the steering apparatus.

Preferred embodiments of the steering apparatus which can, unless they are expressly otherwise excluded or it is technically impossible, be freely combined with each other and with the second aspect, which is described below, of the invention are described below.

In a number of embodiments, the coupling device has: (i) a converter element which is rotatably supported about a rotation axle with respect to the lever element; (ii) a threaded spindle which is connected in a rotationally secure manner to the lever element and which is at least partially surrounded by the converter element and which has a thread which extends along a spindle axis; and (iii) a coupling element which is rotatable about the threaded spindle and which is configured to couple the threaded spindle to the converter element mechanically so that, in the event of a rotational movement, which is brought about by the lever element being rotated, of the threaded spindle with respect to the coupling element, the coupling element is translationally driven along the spindle axis by means of the thread of the threaded spindle and in this case cooperates with the guide which is provided on or in the threaded spindle or the converter element in the manner of a forced guide. A movement of the converter element is thereby brought about, which movement is defined by the geometric extent of the guide and has a rotation of the converter element about the rotation axle or a translational movement, which is orthogonal to the rotation axle, of the converter element. Furthermore, the coupling device is further configured to transmit the movement of the converter element to the handle element so that the handle element thereby rotates relative to the threaded spindle.

The coupling element may in particular be a member with an internal thread which cooperates with an external thread of the threaded spindle.

In these embodiments, the desired rotation of the handle element is brought about in a simple and extremely reliable, robust and deterministic mechanical manner by the rotational movement of the threaded spindle being converted into a translational movement of the coupling element, which is again modulated by the guide or which itself modulates a movement of a converter element which has the guide. The modulated movement of the coupling element or the converter element is then converted into a correspondingly modulated rotational movement of the handle element. Overall, therefore, a special shaping of the guide is used here for the translational movement of the coupling element in order to define the modulation of the rotational movement of the handle element.

In some of these embodiments, the geometric extent of the guide is configured so that the corresponding extent, which is thereby defined, of the rotation or translational movement of the converter element at least partially alternates, which may in particular be undulating. In this case, the extent of the guide can particularly be configured so that the resultant alternating movement alternates in accordance with the steering angle of the lever element so that for each steering angle the resultant redirection of the handle element relative to a non-redirected rest position which occurs at the steering angle zero (steering in the straight-ahead position) is a maximum of 100°, preferably a maximum of 90°. One advantage of such an alternating modulation, in particular also the above-mentioned redirection limitation, involves the fact that the driver of the vehicle always has to rotate his/her hand during such a modulation, even with large steering angles beyond 180°, particularly also beyond 360°, only in an angular range which can be carried out on the basis of the human anatomy substantially only by a hand rotation by means of the lower arm while the shoulder and upper arm can be at least substantially left in the initial position thereof to this end. This increases the ergonomics and operation-friendliness of the steering apparatus.

The at least partially alternating extent of the rotation or translational movement of the converter element can be periodic or non-periodic at least in sections. An initially partially non-periodic extent can particularly be used to configure the rotation angle of the handle element relative to the lever element in accordance with the steering angle so that, in the case of rotations beyond a limit angle of, for example, 360° (or another predetermined limit angle which defines the start of the non-periodic extent), a different rotation behavior of the handle element is brought about from that in the case of a steering angle under the limit angle. In this manner, additional feedback can be given to the driver of the vehicle with respect to the current steering angle or steering angle range.

In some embodiments, the steering apparatus further has a hollow shaft which at least partially surrounds the converter element and which is coupled to the coupling element in a rotationally secure manner. This coupling can be achieved particularly using a guide structure on the hollow shaft, which guide structure is provided for this purpose and with which the coupling element cooperates. In particular, this guide structure can be provided by a web, a slot or a groove in the hollow shaft, along which the coupling element is forcibly guided during its translational movement. The coupling element can to this end have in particular a portion, for example, a pin or projection in the case of a slot or a groove acting as a guide or in the form of a U-shaped guide portion in the case of a web, which cooperates with the guide for the purpose of forced guiding.

In some embodiments with a hollow shaft, the steering apparatus further has an orientation device which is configured to apply a torque to the hollow shaft in order, when the steering apparatus is mounted on the steering axle of the steering column of the vehicle, to rotate the hollow shaft in the case of a rotation of the lever element about a steering angle in a rotation direction counter to this rotation relative to the lever element so that the rotation of the hollow shaft which is brought about by the orientation device and the rotation of the hollow shaft which is caused by the rotation of the lever element about the steering axle at least substantially compensate for each other. Thus, the orientation of the hollow shaft in space or vehicle can be maintained during the rotation of the lever element during the steering operation at least substantially while the handle element rotates relative thereto according to the modulation.

According to a number of embodiments, the orientation device can have in particular a toothed wheel which engages in an external tooth arrangement of the hollow shaft in order to transmit the torque, which can be applied to the hollow shaft by the orientation device or which is applied during operation, to the hollow shaft. The toothed wheel can again be coupled to a portion of the steering apparatus, in particular by means of a gear mechanism, which portion does not also move during the rotation of the lever element during the steering operation.

In order to transmit the torque, instead of the toothed wheel and the external tooth arrangement of the hollow shaft, in particular an equivalent torque decoupling by means of a belt or a multiple joint can be used.

In some embodiments, the steering apparatus further has a housing, with respect to which the converter element is rotatably supported, wherein the housing is connected in a rotationally secure manner to the threaded spindle and the lever element or is constructed integrally with the threaded spindle and/or the lever element. The housing can particularly be configured to enclose the threaded spindle completely or partially and to provide an in particular rotatable bearing for the converter element or the hollow shaft.

In some embodiments, the converter element has a sleeve which at least partially surrounds the threaded spindle and the coupling element, in particular it can generally be in the form of such a sleeve. One advantage which is connected therewith is that the sleeve-like shape can simultaneously act as protection of the threaded spindle with respect to influences coming from outside, in particular with respect to mechanical influences, in particular disruptions or impurities. Particularly, however, the sleeve-like shape is advantageous with regard to a first group of embodiments in which the guide is in the form of a slotted member, for example, as a slot or groove, in the sleeve which cooperates with a portion, which acts as a slotted block, of the coupling element in the manner of a slotted guiding member so that the coupling element during the translational movement thereof along the threaded spindle causes the converter element to carry out a rotational movement about the rotation axle in accordance with the geometric extent of the guide in order therefore to rotate the converter element into a rotation position which corresponds to the instantaneous position of the slotted block in the slotted member with respect to the rotation axle.

In some variants of these embodiments, the hollow shaft is further coupled to the coupling element in a rotationally secure manner by the slotted block in the manner of an additional forced guide cooperating with a guide structure which is constructed in or on the hollow shaft and the extent of which is configured so that the slotted block can accordingly move in translation along the threaded spindle but cannot move in rotation relative to the hollow shaft in the context of this additional forced guiding of the translational movement of the coupling element. In particular, the slotted guide may be in the form of a slot while a portion of the coupling element is in the form of a slotted block which engages in this slot and which engages through this slot so that it can cooperate in the manner of the additional forced guide with the distal end thereof with the guide structure which is constructed on the hollow shaft, for example, with a groove which is constructed on the inner wall of the hollow shaft.

This constitutes a possibility, which can be implemented without a high level of additional complexity, of achieving a relative rotational movement between the threaded spindle and the coupling element so that, in the event of a rotation of the threaded spindle relative to the coupling element, as a result of the effect of the thread of the threaded spindle on the coupling element, a translational propulsion of the coupling element along the extent of the threaded spindle is brought about.

In some embodiments, the handle element is rotationally coupled to the converter element, in particular connected in a rotationally secure manner, or constructed integrally therewith so that a rotation of the converter element about the rotation axle brings about a corresponding rotation of the handle element. In this manner, a rotational movement, which is brought about by the modulated translational movement of the coupling element, of the converter element is converted into a correspondingly modulated rotational movement of the handle element.

In a second group of embodiments, the guide is provided for the coupling element at least partially by a thread turn of the threaded spindle. Furthermore, the coupling element has one or more sensing elements, in particular pins, which each engage in the thread turn of the thread so that the coupling element in the case of a rotation of the spindle axis in the manner of a forced guide interacts with the thread. The thread turn of the thread has a depth which varies along the extent of the spindle axis so that, in the event of a translational movement, driven by the threaded spindle, of the coupling element along the spindle axis, a translational movement of the converter element is brought about in a direction which is orthogonal to the rotation axle and which is defined (and thereby modulated) by the varying depth extent, which is passed through along the spindle axis, of the thread turn.

In some of these embodiments, the hollow shaft is coupled to the converter element by means of a direct or indirect, positive-locking connection in such a manner that the positive-locking connection allows the translational movement of the converter element in the direction orthogonal to the rotation axle, but no relative rotation of the converter element with respect to the hollow shaft about the rotation axle. This can be caused particularly by the inherent shaped structure on the hollow shaft with which the converter element cooperates. The shaped structure may in particular be a, for example, planar guide face which mechanically cooperates with a guide face, which is parallel therewith, of the converter element in order to block any tilting actions of the two guide faces relative to each other.

In some of the embodiments, there is further provided a sliding layer which is arranged between the hollow shaft and the converter element and which is suitable for reducing a friction resistance between the hollow shaft and the converter element during the translational movement of the converter element relative to the hollow shaft. In addition to the positive effect of the friction reduction with regard to the ease of movement of the handle element rotation, this has the additional advantage that possible abrasion which could result in disruptions over time is reduced or even prevented.

In some embodiments, the handle element is rotatably supported with respect to the converter element and coupled thereto by means of a transmission element so that the transmission element transmits the translational movement, which is orthogonal to the rotation axle, of the converter element to the handle element so that, in this case, a torque is applied to the handle element in order to rotate it into a rotation position which corresponds to the instantaneous position of the coupling element along the extent of the threaded spindle. According to some variants thereof, the transmission element has a rod-shaped rigid member which is coupled to the converter element or which is part thereof in order to bring about the mechanical transmission of the translational movement, which is orthogonal to the rotation axle, of the converter element to the handle element. To this end, the rod-shaped member can be applied to the handle element, in particular eccentrically relative to the rotation axle of the handle element, in order thus to convert the translational movement thereof into a torque with respect to the handle element and consequently into the rotational movement thereof.

In some embodiments, the steering apparatus further has an additional handle element for actuating the steering apparatus by means of a, particularly different, hand of a driver of the vehicle, wherein the two handle elements are arranged with spacing from each other on the lever element. The additional handle element is rotationally coupled to the lever element by means of an additional coupling device of the same construction type and rotatably supported relative thereto. However, the respective guides of the two coupling devices have respective extents which differ from each other so that the resultant individual extents of the respective rotational movements of the two handle elements differ from each other during a rotation of the lever element about the steering axle at least in a steering angle range. Thus, handle positions for the two handle elements can also be achieved, wherein the orientations thereof differ from each other in accordance with the steering angle. This can correspond to an optimum with respect to the achievable operation-friendliness and ergonomics in some steering angles.

The term "same construction type" is intended to be understood in this instance to mean that the two coupling devices are configured according to the same fundamental operating principle. This means that they each convert the rotational movement, which occurs during the steering movement, of the lever element into a translational movement of a coupling element of the respective coupling device and bring about a subsequent conversion of this translational movement back into a rotational movement of the associated handle element relative to the lever element in such a manner that the respective coupling element during its translational movement is operationally connected in the manner of a forced guide to a guide so that the geometric extent of the guide defines a steering-angle-dependent extent of the rotational movement of the associated handle element. The coupling devices do not have to be constructed identically and can also differ in terms of one or more aspects other than only in terms of the extent of the guides thereof, as long, however, as the above-mentioned operating principle is complied with.

A second aspect of the invention relates to a vehicle having a steering system which is provided with a steering apparatus for actuating the steering system according to the above-mentioned first aspect of the invention.

The features and advantages which are explained in relation to the first aspect of the invention also apply accordingly to the additional aspects of the invention.

Additional advantages, features and possible applications of the present invention will be appreciated from the following detailed description in connection with the figures.

BRIEF DESCRIPTION OF THE DRAWINGS

In the Figures, the same reference numerals are used continuously for the same or mutually corresponding elements of the invention.

DETAILED DESCRIPTION OF THE DRAWINGS

Figure 1:
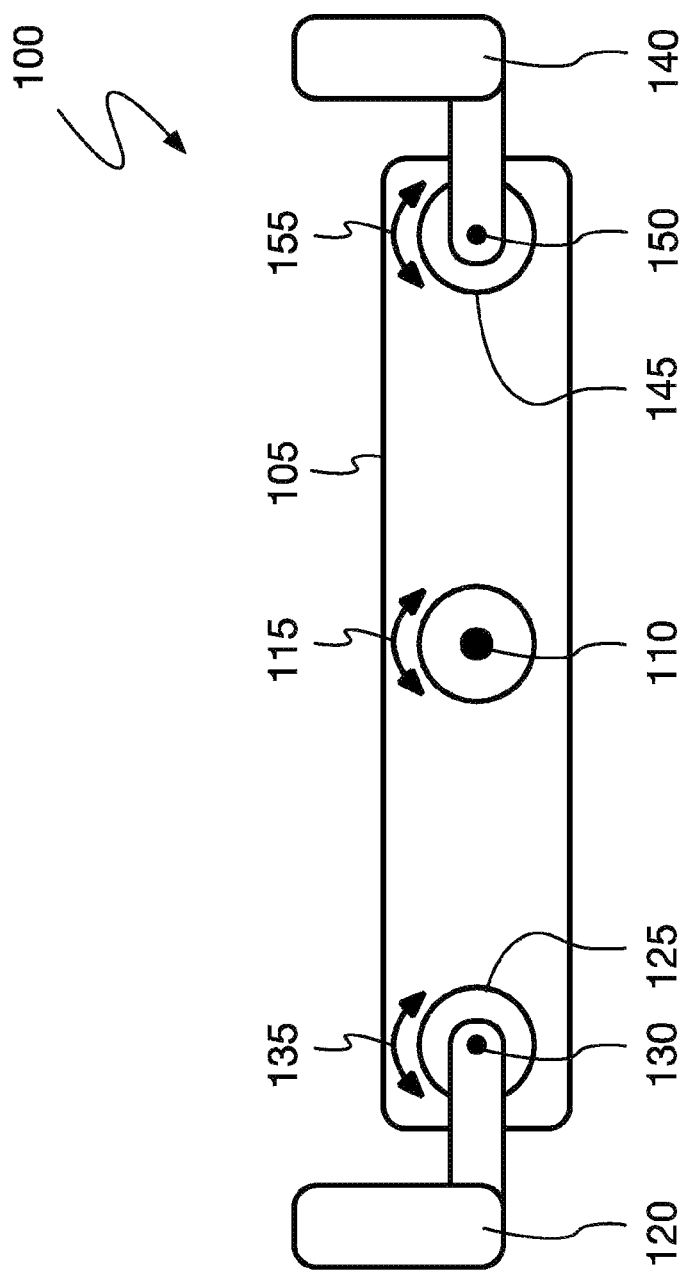
FIG. 1 is a schematic overview of a steering apparatus according to different embodiments.

FIG. 1 schematically illustrates an exemplary embodiment of a steering apparatus 100 according to the invention. The steering apparatus has a lever element 105 which is in the form of a transverse bar and which is rotatably mounted on a steering column with a steering axle 110 of a steering column so that, by means of a rotation of the lever element 105, a steering angle 115 can be passed through and in this case a steering system, in particular a transverse steering system, of a vehicle which is provided with the steering apparatus 100, can be accordingly actuated.

At the two ends of the transverse or lever element 105, there are provided handle elements 120 (in particular for the left hand) and 140 (in particular for the right hand), the form of which is configured so that they can be effectively gripped by the driver or operator of the vehicle with a corresponding hand, respectively, and can be moved along a travel curve about the steering axle 110 in order thus to carry out a torque on the lever element 105 which is coupled thereto in order to adjust a steering angle 115. A, particularly temporary, one-handed operation using only one of the handle elements 120, 140 is also possible.

Each of the handle elements 120, 140 is mechanically coupled by means of an associated coupling device 125 and 145 to the lever element 105, wherein the coupling devices 125 and 145 are arranged at opposite ends of the lever element 105. Each of the coupling devices 125 and 145 is configured in this case so that it transmits, on the one hand, a rotational movement which is brought about by the driver of the vehicle, of the handle element 120 and 140 about the steering axle 110 of the steering column to the corresponding end of the lever element 105 in order to bring about a torque thereon and so that, on the other hand, it brings about a relative inherent rotation of the respective handle element 120 and 140 about an associated rotation axle 130 and 150, respectively, about a, particularly individual, rotation angle 135 and 155. In this manner, an orientation which is dependent on the steering angle 115 is produced for each of the handle elements 120 and 140 with respect to the respective rest position which is illustrated in FIG. 1.

Figure 2A:
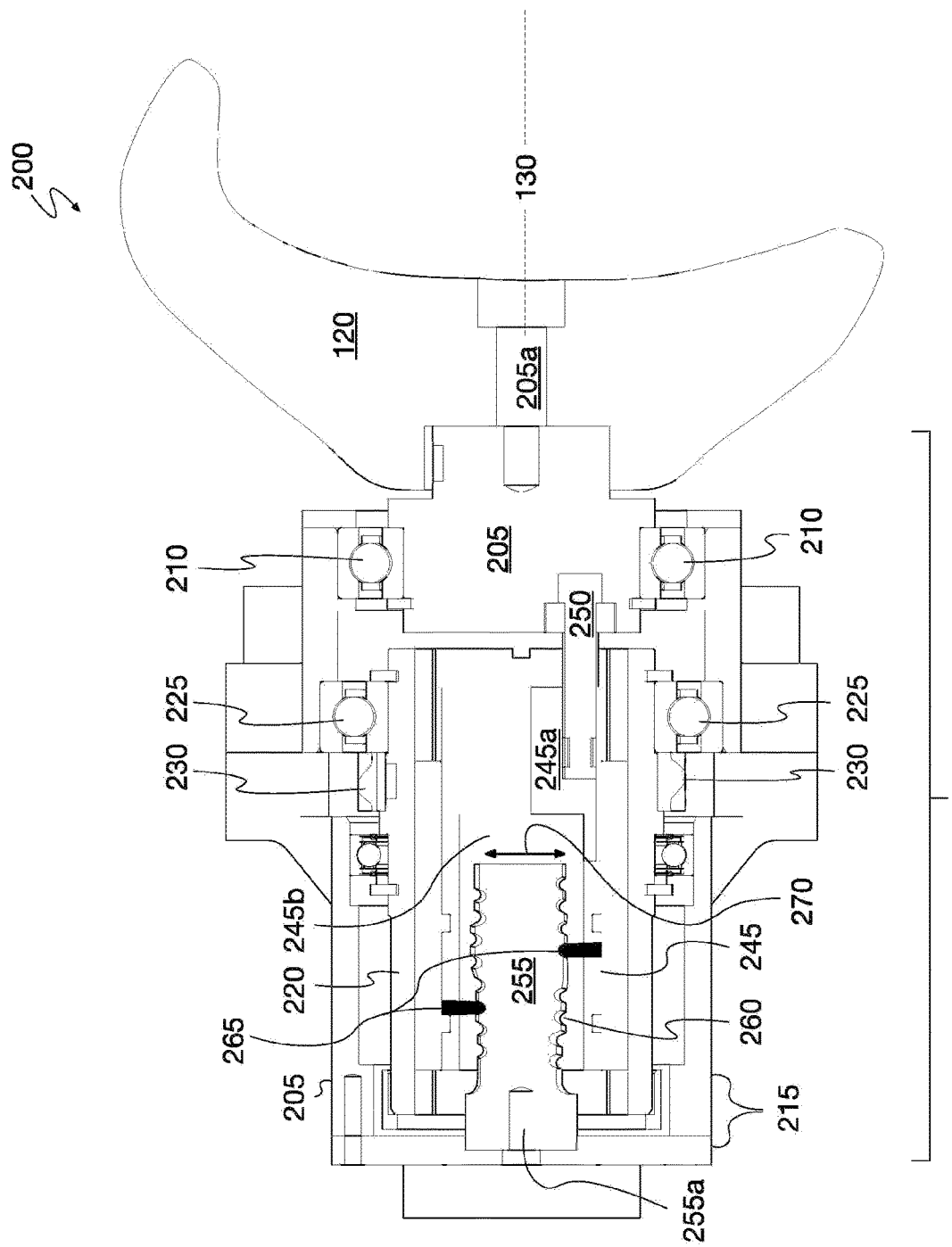
FIG. 2A is a cross sectional view, in particular of a coupling device with a handle element, of a steering apparatus according to one embodiment.
Figure 2B:
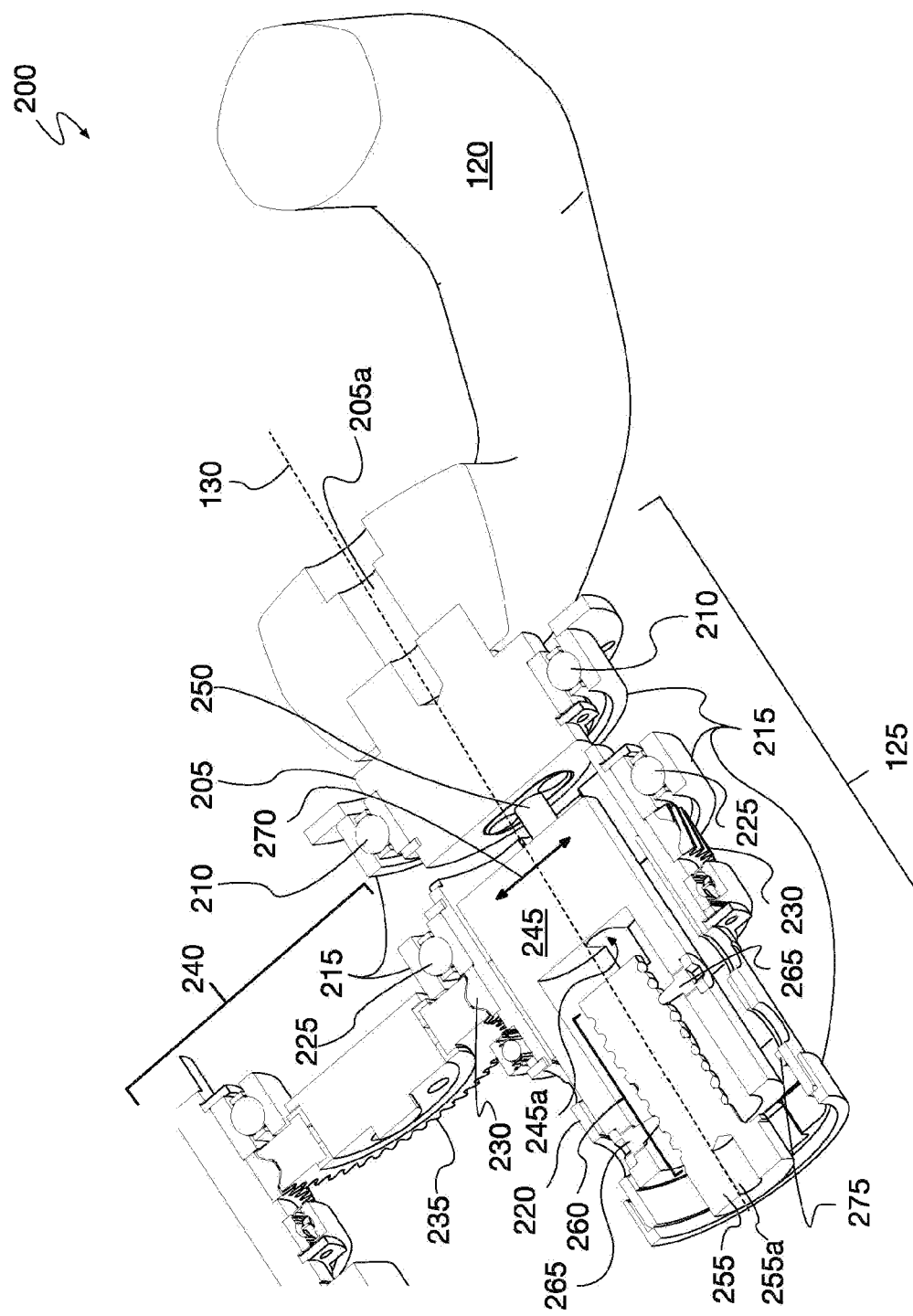
FIG. 2B is a perspective sectional view, in particular of a coupling device with a handle element, of the steering apparatus from FIG. 2A.

FIGS. 2A and 2B relate to an exemplary embodiment 200 (corresponding to the above-mentioned second group of embodiments) of the steering apparatus 100 and each show, using the example of the corresponding arrangement for the left handle element 120, this handle element itself and the associated coupling device 125 thereof. However, a corresponding construction is also possible, particularly advantageous, for the right handle element 140 and the associated coupling device 145 thereof.

In the embodiment 200, the coupling device 125 has a handle base 205, on which the handle element 120 is mounted. This securing can be configured particularly, as illustrated, by means of a screw through a screw hole 205*a*. Alternatively, the handle element 120 can also be constructed integrally with the handle base 205 so that in this case the handle element 120 itself is part of the coupling device 125. The handle base 205 is supported in a housing 215 of the coupling device 125 so as to be rotatable by means of a bearing, in particular ball bearing, 210 about the rotation axle 130.

Furthermore, a hollow shaft 220 is supported in the housing 215, in particular coaxially with the rotation axle 130, by means of a plurality of bearings 225 so as to be able to rotate about the rotation axle 130. The hollow shaft has an external tooth arrangement 230 which is accessible from outside the housing 215 and which is engaged with a toothed wheel 235 of an orientation device 240. The orientation device 240 serves to maintain the relative orientation of the hollow shaft 220 in space in the event of a rotation of the lever element 105 with the steering axle 110 by the hollow shaft 220 accordingly being rotated by means of the toothed wheel 235 and the external tooth arrangement 230 so that this inherent rotation of the hollow shaft 220 with respect to the lever element 105 compensates for the co-rotation, brought about by the rotation of the lever element 105, of the hollow shaft 220. The orientation of the hollow shaft consequently corresponds to an orientation, which is independent of the steering angle 115, of the handle elements 120 and 140 in the rest position thereof, as shown in FIG. 1 (vertical orientation of the handle regions of the handle elements).

There is provided inside the hollow shaft 220 a converter element 245 which is coupled to the hollow shaft 220 in a rotationally secure manner, in particular by means of a positive-locking connection (for example, at two parallel, planar faces which are located one on the other), relative thereto but can carry out a translational movement in a direction 270 which is orthogonal relative to the rotation axle 130. Between the hollow shaft 220 and the converter element, in order to reduce friction during this translational movement a sliding layer 275 can be provided. The converter element has a sleeve-like portion having a cavity 245*b* which is located therein. A threaded spindle 255 extends into this cavity 245*b* with a/an (external) thread 260. The threaded spindle 255 is, for example, securely connected to the housing 215 by means of a screw which is guided through a screw hole 255*a* or even integrally constructed therewith. In this case, it is spaced apart from the inner walls of the cavity 245*b* so that the converter element 245 can carry out a translational movement in the direction 270 relative to the threaded spindle 255 over a specific path without coming into contact with the inner walls of the cavity 245*b* in this case.

Furthermore, the converter element 245 has a second cavity 245*a*, in which a, in particular pin-like, transmission element 250 which is securely connected to the handle base 205 eccentrically with respect to the rotation axle 130 extends. The shape of the second cavity 245*a* is configured in this case so that a translational movement of the converter element 245 in the direction 270 is transmitted to the transmission element 250, whereby the transmission element 250 as a result of the eccentric coupling thereof to the handle base 205 applies a torque thereto and simultaneously to the handle element 120 which is securely connected thereto. As a result, the handle base 205 and the handle element 120 carry out in the bearing 210 thereof a rotational movement corresponding to the movement of the transmission element 250 and in this case change the orientation of the handle element 120 relative to the lever element 105 accordingly, in particular out of the rest position.

The thread turn of the thread of the threaded spindle 255 has a varying depth. A coupling element 265, which in the present example has two sensing elements which each engage in the thread turn of the threaded spindle 255 and which are thereby force-guided both in a direction parallel with the rotation axle 130 and in the direction 270 orthogonal thereto by the thread turn which acts as a guide, engages in the thread turn.

If, therefore, when the steering apparatus is actuated by means of the handle element 120, a torque is now applied to the lever element 105 in order to rotate it with the steering axle 110 of the steering column, the threaded spindle 255 which is coupled to the lever element 105 in a rotationally secure manner also rotates relative to the hollow shaft 220 which is constantly retained in the orientation thereof by means of the orientation device 240 and the converter element 245 which is connected thereto again in a rotationally secure manner. Consequently, a rotational movement of the threaded spindle 255 relative to the sensing elements of the coupling element 265 is also produced, whereby they move in the context of the above-mentioned forced guiding as a result of the action of the thread, on the one hand, in a direction parallel with the rotation axle 130 and, on the other hand, in the direction 270 which extends perpendicularly thereto, and they transmit this movement to the converter element 245.

The variable depth extent of the thread turn of the threaded spindle 255 consequently modulates via the sensing elements of the coupling element 265 the translational movement, which is brought about in the direction 270, of the converter element 245 relative to the hollow shaft 220. This translational movement is then coupled via the transmission element 250, as already described above in detail, to the handle base 205 and consequently the handle element 120, whereby they are rotated in accordance with the modulation. Overall, consequently, a rotation position which is dependent on the steering angle 115 of the handle element 120 is produced, on the one hand, relative to the lever element 105 and, on the other hand, relative to the hollow shaft 220 and consequently in space or the vehicle per se.

Figure 3A:
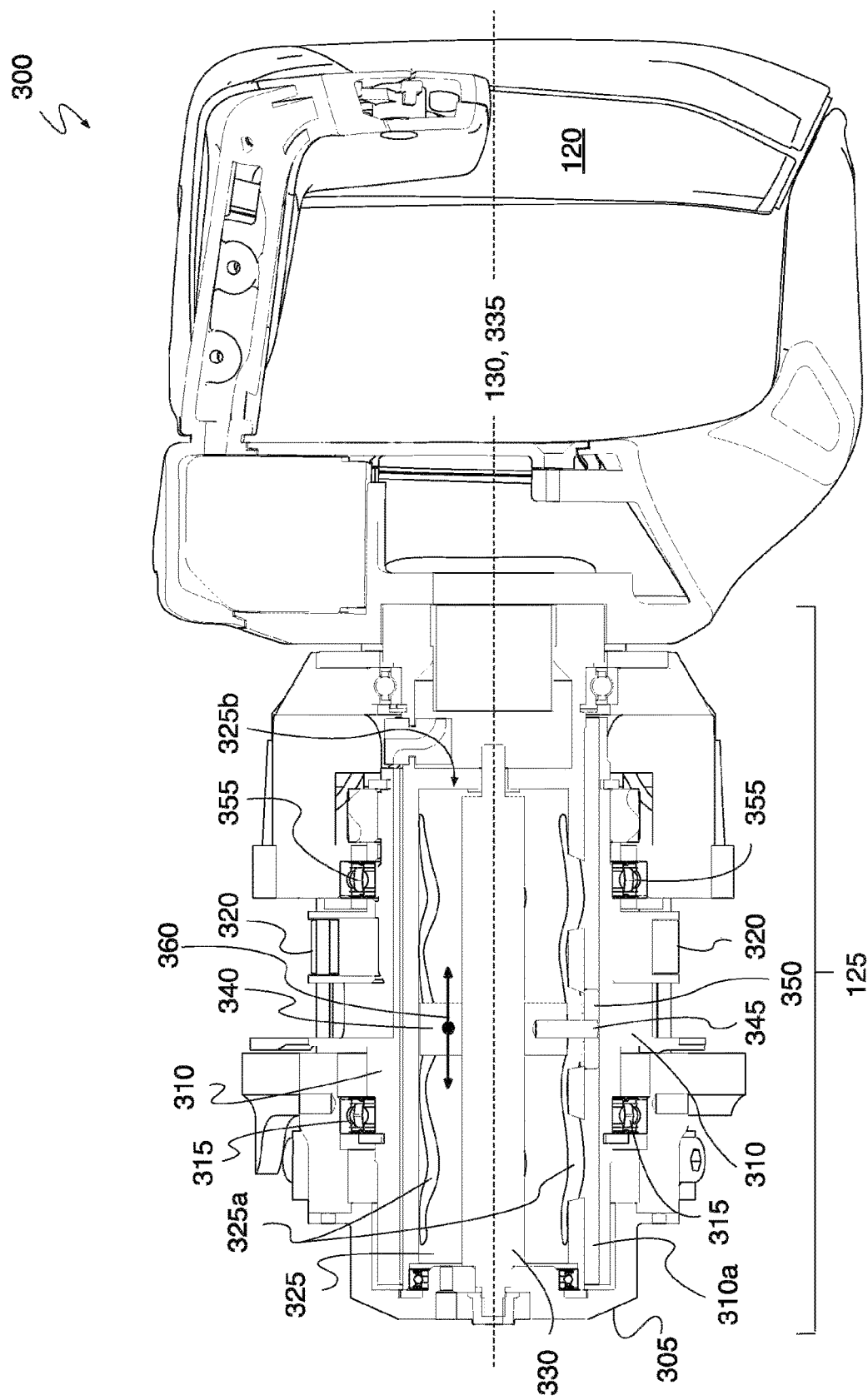
FIG. 3A is a cross sectional view, in particular of a coupling device with a handle element, of a steering apparatus according to another embodiment.
Figure 3B:
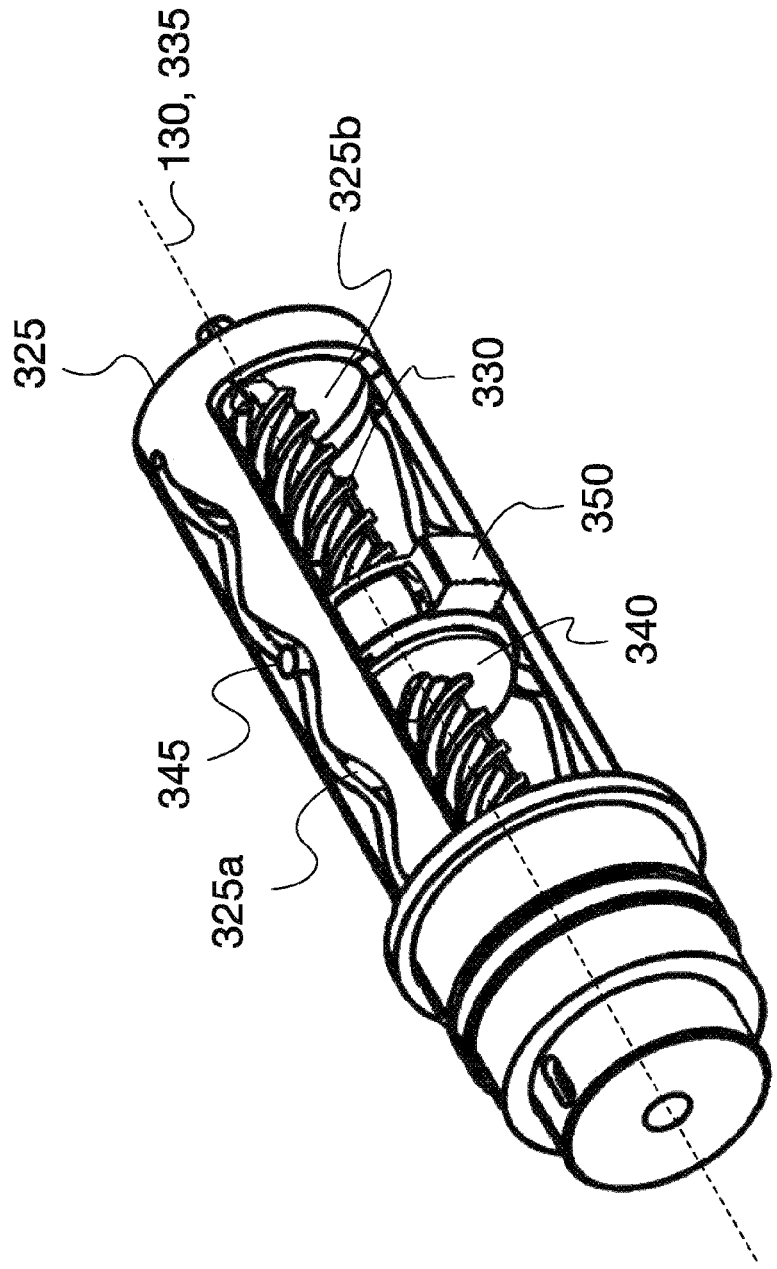
FIG. 3B is a perspective view of a cut-out of the coupling device of the steering apparatus from FIG. 3A.

FIGS. 3A and 3B relate to another exemplary embodiment 300 of the steering apparatus 100 (corresponding to the above-mentioned first group of embodiments). FIG. 3A, using the example of the corresponding arrangement for the left handle element 120 this handle element and its associated coupling device 125. FIG. 3B shows in even greater detail a portion of the coupling device 125. However, a corresponding construction is again also possible, particularly advantageous, for the right handle element 140 and its associated coupling device 145.

In the embodiment 300, the coupling device 125 has a housing 305, in which a hollow shaft 310 and, in a coaxial manner in the inner space thereof, a converter element 325 are arranged. The hollow shaft 310 is rotatably supported in the housing 305, in particular by means of a bearing 315. The converter element 325 is again rotatably supported with respect both to the hollow shaft 310 and to the housing 305. All these rotations relate in this case to a common rotation axle 335 which coincides in particular with the rotation axle 130 of the handle element 120.

The hollow shaft 310 has an external tooth arrangement 320 which is accessible from outside the housing 305 and which is engaged with a toothed wheel (not illustrated) of an orientation device (not illustrated). The orientation device can be constructed particularly according to the orientation device 240 of the embodiment 200. It is used to maintain the relative orientation of the hollow shaft 310 in space during a rotation of the lever element 105 with the steering axle 110 by the hollow shaft being accordingly rotated by means of the toothed wheel and the external tooth arrangement so that this inherent rotation of the hollow shaft with respect to the lever element 105 compensates for the co-rotation, which is brought about by the rotation of the lever element 105, of the hollow shaft 310. The orientation of the hollow shaft consequently corresponds to an orientation, which is independent of the steering angle 115, of the handle elements 120 and 140 in the rest position thereof, as shown in FIG. 1 (vertical orientation of the handle regions of the handle elements).

The converter element 325 has a sleeve-like portion having a cavity 325b which is located therein. A threaded spindle 330 extends with an (external) thread into this cavity 325b. The threaded spindle 330 is securely connected to the housing 305 or even integrally constructed therewith. One or—as illustrated—more slotted members 325a for a slotted guiding member, the longitudinal extent of which extends substantially parallel with the rotation axle 335, is/are constructed in the wall of the sleeve-like portion of the converter element 325 in the form of a continuous, undulating slot.

The coupling device 125 further has a coupling element 340 which is constructed in particular as a member having an internal thread, preferably as a spindle nut which corresponds to the thread of the threaded spindle. For each of the slotted members 325a, a respective guide pin 345 which acts as a slotted block in the manner of a slotted guiding member with respect to the associated slotted member 325a is constructed on the coupling element 340. To this end, the guide forces 345 extend through the respective slot of the associated slotted member 325a and each have, at the end thereof located outside the converter element, a sliding element 350 which engages in a rectilinear guide structure 310a which is constructed on the inner wall of the hollow shaft 315 and which is in the form of a groove and which can run therein in the case of a corresponding movement of the coupling element 340 with forced guiding at both sides which is carried out perpendicularly thereto at the same time. Additionally or alternatively, one or more sliding elements 350, which are separate from the slotted block 345, with associated guide structures can also be provided in or on the hollow shaft 310. An example of this is illustrated in FIG. 3B.

If a torque is applied to the lever element 105 by means of the handle element 120 when the steering apparatus is actuated in order to rotate it with the steering axle 110 of the steering column, therefore, the threaded spindle 330 which is coupled to the lever element 105 in a rotationally secure manner also rotates relative to the hollow shaft 310 which is held constantly in the orientation thereof by means of the orientation device. The coupling element which is held in a rotationally secure manner with respect to the hollow shaft 310 by means of the slotted block 345 and the sliding element 350 which runs linearly in the groove 310a is thereby driven by the action of the rotating thread of the threaded spindle on the internal thread thereof in translation in the translation direction 360. During this translational movement, each slotted block 345 runs through the associated slotted member 325a thereof in the wall of the converter element 325, whereby it applies a torque thereto about the rotation axle 335 in accordance with the geometric extent of the associated slotted member 325a in order to rotate it in accordance with the (geometric) extent of the associated slotted member 325a. The geometric extents of the different slotted members correspond to each other in this case so that they all define the same rotational movement of the converter element 325. The handle element 120 is again rigidly coupled to the converter element 325 or integrally constructed therewith so that the rotation of the converter element 325 is transmitted to the handle element 120.

The geometric extents (which are identical to each other) of the slotted members 325a (there may also be provided only one single slotted member) consequently modulates via the force-guided cooperation with the slotted block 345 the rotational movement of the converter element and the handle element 120. Overall, consequently, a rotation position, which is dependent on the steering angle 115, of the handle element 120 is produced, on the one hand, relative to the lever element 105 and, on the other hand, relative to the hollow shaft 310 and consequently in space or the vehicle per se.

In the steering apparatuses according to FIGS. 1 to 3B, the respective coupling device 125, 145 of each handle element 120 and 140 is consequently configured to convert the rotational movement, which occurs during the steering movement, of the lever element 105 about the steering axle 110 into a translational movement of the respective coupling element 265 in the direction 270 or 360 of the coupling element 340 of the coupling device 125 or the coupling element 340 of the coupling device 145, and to bring about a subsequent conversion of this translational movement back into a rotational movement of the handle element 120 and 140 relative to the lever element 105 in such a manner that the coupling element 265 or 340 during the translational movement thereof in the manner of a forced guiding is actively connected to a guide 260 or 325a so that the geometric extent of the guide 260 or 325a defines a steering-angle-dependent extent of the rotational movement of the handle element 120 or 140, respectively.

Figure 4:
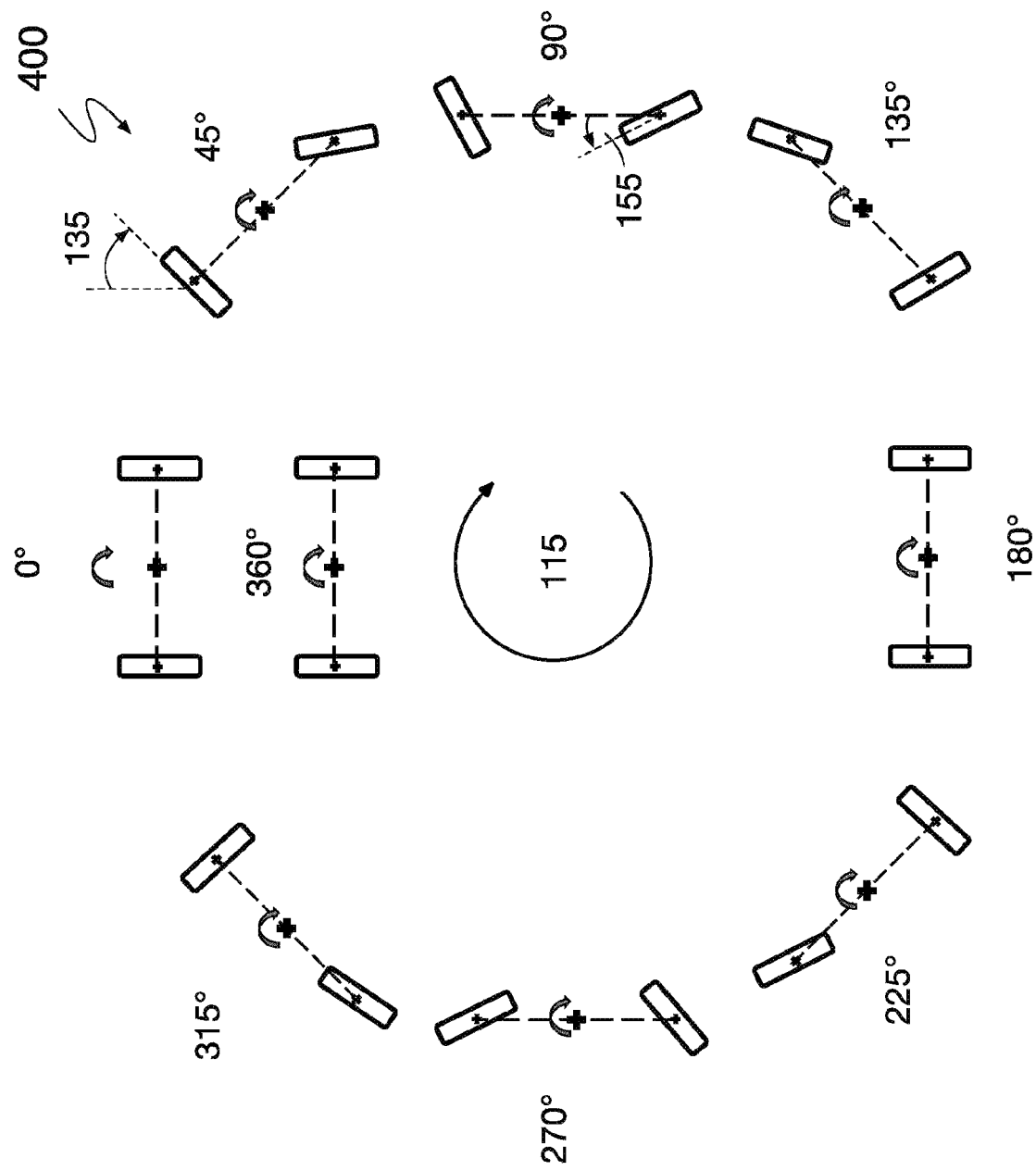
FIG. 4 is a schematic illustration of an example of a steering angle dependency, which can be implemented according to the invention, of the steering angle of the handle elements with respect to the rest position thereof.

FIG. 4 schematically illustrates an example 400 of a steering wheel dependence, which can be implemented particularly by means of one of the above-described steering apparatuses according to different embodiments, of the rotation angles 135 and 155 of the handle elements 120 and 140 with respect to the rest position thereof (for example, at a steering angle 115 of 0°). The steering-angle-dependent rotation angle extents can differ from each other for the two handle elements 120 and 140 particularly also, as illustrated by way of example in FIG. 4, so that for each handle element 120 and 140 or each hand, an individual, in particular ergonomically optimized, rotation angle extent can be achieved. While FIG. 4 illustrates only a complete revolution of the steering angle 115 through 360°, the steering angle is not necessarily limited to a single complete revolution or a steering angle therebelow, but instead it can extend beyond and even include several complete revolutions. In this case, it is even possible to configure the steering angle extent differently for successive revolutions so that the rotation angles 135 or 155 relative to the steering angle α can differ from those relative to the steering angle α+360°, which can be achieved by corresponding construction of the guide 260 or 325a.

While at least one exemplary embodiment has been described above, it should be noted that a large number of variations thereof exist. In this case, it should also be noted that the described exemplary embodiments only constitute non-limiting examples and it is not intended to thereby limit the scope, the applicability or the configuration of the apparatuses and methods described herein. Instead, the preceding description will provide for the person skilled in the art guidance for implementing at least one exemplary embodiment, wherein it will be understood that different modifications in the operation and the arrangement of the elements described in an exemplary embodiment can be carried out without departing from the subject-matter set out in the appended claims and the legal equivalents thereof.

LIST OF REFERENCE NUMERALS

100 Steering apparatus
105 Lever element or transverse element
110 Steering axle or steering column
115 Steering angle
120 (First or left) handle element
125 Coupling device for handle element 120
130 Rotation axle for handle element 120
135 Rotation angle of handle element 120
140 (Second or right) handle element
145 Coupling device for handle element 145
150 Rotation axle for handle element 145
155 Rotation angle of handle element 120
200 Partial view of a first embodiment of the steering apparatus 100
205 Handle base
205a Screw hole
210 Bearing of handle base
215 Housing
220 Hollow shaft
225 Bearing of hollow shaft
230 External tooth arrangement of hollow shaft
235 Toothed wheel
240 Orientation device (proportional)
245 Converter element
245a Cavity for receiving the transmission element
245b Hollow space for receiving the threaded spindle
250 Transmission element
255 Threaded spindle
255a Screw hole
260 Guide, at same time thread with thread turn
265 Coupling element with sensing elements
270 Translation direction, orthogonal to rotation axle 130
275 Sliding layer
300 Partial view of a second embodiment of steering apparatus 100
305 Housing
310 Hollow shaft
310a Guide structure (groove) for slotted block in hollow shaft 310
315 Bearing of hollow shaft
320 External tooth arrangement of hollow shaft
325 Converter element, at same time sleeve
325a Guide in form of slotted member(s)
325b Cavity
330 Threaded spindle
335 Rotation axle of threaded spindle and converter element
340 Coupling element, in particular spindle nut
345 Slotted block
350 Sliding element
355 Bearing for handle element
360 Translation direction
400 Exemplary rotation angle behavior in accordance with steering angle

The invention claimed is:

1. A steering apparatus for a vehicle, comprising:
a handle element for actuating the steering apparatus via one hand of a driver of the vehicle;
a lever element for transmitting a torque to a steering axle of a steering column of the vehicle in order to steer the vehicle; and
a coupling device for bringing about a force-converting coupling between the handle element and the lever element in order to convert a steering movement which is carried out on the handle element into a rotational movement of the lever element about a steering angle with respect to the steering axle;
wherein the handle element is rotatably supported with respect to the lever element; and
wherein the coupling device is configured to convert the rotational movement, which occurs during the steering movement, of the lever element into a translational movement of a coupling element of the coupling device and to bring about a subsequent conversion of said translational movement back into a rotational movement of the handle element relative to the lever element such that the coupling element, during the translational movement, is actively connected to a guide in the manner of a forced guide so that a geometric extent of the guide defines a steering-angle-dependent extent of the rotational movement of the handle element.

2. The steering apparatus according to claim 1, wherein the coupling device comprises:
   a converter element which is rotatably supported about a rotation axle with respect to the lever element;
   a threaded spindle which is connected in a rotationally secure manner to the lever element and which is at least partially surrounded by the converter element and which has a thread which extends along a spindle axis; and
   the coupling element which is rotatable about the threaded spindle and which is configured to couple the threaded spindle to the converter element mechanically so that, in the event of a rotational movement, which is brought about by the lever element being rotated, of the threaded spindle with respect to the coupling element, the coupling element is translationally driven along the spindle axis by way of the thread of the threaded spindle and in this case cooperates with the guide which is provided on or in the threaded spindle or the converter element in the manner of a forced guide, whereby a movement of the converter element is thereby brought about, which movement is defined by the geometric extent of the guide and has a rotation of the converter element about the rotation axle or a translational movement, which is orthogonal to the rotation axle, of the converter element;
   wherein the coupling device is further configured to transmit the movement of the converter element to the handle element so that the handle element rotates relative to the threaded spindle.

3. The steering apparatus according to claim 2, wherein the geometric extent of the guide is configured so that the corresponding extent, which is thereby defined, of the rotation or translational movement of the converter element at least partially alternates.

4. The steering apparatus according to claim 3, wherein the at least partially alternating extent of the rotation or translational movement of the converter element is non-periodic at least in sections.

5. The steering apparatus according to claim 2, further comprising:
   a hollow shaft which at least partially surrounds the converter element and which is coupled to the coupling element in a rotationally secure manner.

6. The steering apparatus according to claim 5, further comprising:
   an orientation device configured to apply a torque to the hollow shaft in order, when the steering apparatus is mounted with the steering axle of the steering column of the vehicle, to rotate the hollow shaft in the case of a rotation of the lever element about a steering angle with respect to the steering axle in a rotation direction counter to said rotation relative to the lever element so that the rotation of the hollow shaft, which is brought about by the orientation device and the rotation of the hollow shaft which is caused by the rotation of the lever element about the steering axle, compensate for each other.

7. The steering apparatus according to claim 6, wherein the orientation device has a toothed wheel which engages in an external tooth arrangement of the hollow shaft in order to transmit the torque which is applied to the hollow shaft by the orientation device to the hollow shaft.

8. The steering apparatus according to claim 2, further comprising:
   a housing, with respect to which housing the converter element is rotatably supported, wherein
   the housing is connected in a rotationally secure manner to the threaded spindle and the lever element or is constructed integrally with the threaded spindle and/or the lever element.

9. The steering apparatus according to claim 2, wherein the converter element has a sleeve which at least partially surrounds the threaded spindle and the coupling element.

10. The steering apparatus according to claim 9, wherein the guide is in the form of a slotted member in the sleeve which cooperates with a portion, which acts as a slotted block, of the coupling element in the manner of a slotted guiding member so that the coupling element during the translational movement thereof along the threaded spindle causes the converter element to carry out a rotational movement about the rotation axle in accordance with the geometric extent of the guide in order therefore to rotate the converter element into a rotation position which corresponds to the instantaneous position of the slotted block in the slotted member with respect to the rotation axle.

11. The steering apparatus according to claim 10, further comprising:
   a hollow shaft which at least partially surrounds the converter element and which is coupled to the coupling element in a rotationally secure manner, wherein
   the hollow shaft is coupled to the coupling element in a rotationally secure manner by the slotted block in the manner of an additional forced guide cooperating with a guide structure which is constructed in or on the hollow shaft and the extent of which is configured so that the slotted block accordingly moves in translation along the threaded spindle but cannot move in rotation relative to the hollow shaft in the context of said additional forced guiding of the translational movement of the coupling element.

12. The steering apparatus according to claim 10, wherein the handle element is rotationally coupled to the converter element so that a rotation of the converter element about the rotation axle brings about a corresponding rotation of the handle element.

13. The steering apparatus according to claim 2, wherein the steering apparatus further has an additional handle element for actuating the steering apparatus via a hand of a driver of the vehicle, wherein the two handle elements are arranged with spacing from each other on the lever element;
   the additional handle element is rotationally coupled to the lever element by an additional coupling device of the same construction type and rotatably supported relative thereto; and have respective extents which differ from each other so that the resultant individual extents of the respective rotational movements of the two handle elements differ from each other during a rotation of the lever element about the steering axle at least in a steering angle range.

14. The steering apparatus according to claim 1, wherein the guide is provided for the coupling element at least partially by a thread turn of the threaded spindle;
   the coupling element has one or more sensing elements which each engage in the thread turn of the thread so that the coupling element in the case of a rotation of the spindle axis in the manner of a forced guide interacts with the thread;

the thread turn of the thread has a depth which varies along the extent of the spindle axis so that, in the event of a translational movement, driven by the threaded spindle, of the coupling element along the spindle axis, a translational movement of the converter element is brought about in a direction which is orthogonal to the rotation axle and which is defined by the varying depth extent, which is passed through along the spindle axis, of the thread turn.

15. The steering apparatus according to claim 14, further comprising:

a hollow shaft which at least partially surrounds the converter element and which is coupled to the coupling element in a rotationally secure manner, wherein the hollow shaft is coupled to the converter element by a direct or indirect, positive-locking connection in such a manner that the positive-locking connection allows the translational movement of the converter element in the direction orthogonal to the rotation axle, but no relative rotation of the converter element with respect to the hollow shaft about the rotation axle.

16. The steering apparatus according to claim 15, further comprising:

a sliding layer which is arranged between the hollow shaft and the converter element and which is suitable for reducing a friction resistance between the hollow shaft and the converter element during the translational movement of the converter element relative to the hollow shaft.

17. The steering apparatus according to claim 14, wherein the handle element is rotatably supported with respect to the converter element and coupled thereto by a transmission element so that the transmission element transmits the translational movement, which is orthogonal to the rotation axle, of the converter element to the handle element so that, in this case, a torque is applied to the handle element in order to rotate it into a rotation position which corresponds to the instantaneous position of the coupling element along the extent of the threaded spindle.

18. The steering apparatus according to claim 17, wherein the transmission element has a rod-shaped rigid member which is coupled to the converter element in order to bring about the mechanical transmission of the translational movement, which is orthogonal to the rotation axle, of the converter element to the handle element.

19. A vehicle, comprising:

a steering system; and a steering apparatus according to claim 1 for actuating the steering system.

* * * * *